(12) United States Patent
Gallagher et al.

(10) Patent No.: US 7,055,504 B1
(45) Date of Patent: Jun. 6, 2006

(54) BAROMETRIC PRESSURE DIESEL TIMING CONTROLLER

(75) Inventors: Shawn Michael Gallagher, Erie, PA (US); Eric Richard Dillen, Edinboro, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/196,707

(22) Filed: Aug. 2, 2005

Related U.S. Application Data

(63) Continuation of application No. 11/031,571, filed on Jan. 6, 2005, now abandoned.

(51) Int. Cl.
*F02M 37/04* (2006.01)

(52) U.S. Cl. ............... 123/501; 123/380; 123/383; 701/115

(58) Field of Classification Search ........ 123/380, 123/382, 383, 357, 358, 359, 500, 501, 488, 123/478; 701/115, 101, 102, 114
See application file for complete search history.

(56) References Cited

U.S. PATENT DOCUMENTS

| | | | |
|---|---|---|---|
| 4,634,887 A | 1/1987 | Balch et al. | |
| RE34,803 E | 12/1994 | Chasteen | |
| 5,494,018 A | 2/1996 | Black et al. | |
| 5,630,402 A | 5/1997 | Devine et al. | |
| 5,809,954 A | 9/1998 | Devine et al. | |
| 5,826,563 A | 10/1998 | Patel et al. | |
| 6,158,416 A | 12/2000 | Chen et al. | |
| 6,234,141 B1 * | 5/2001 | Kerns et al. ........ | 123/305 |
| 6,286,479 B1 | 9/2001 | Cryer et al. | |
| 6,286,480 B1 | 9/2001 | Chen et al. | |
| 6,325,050 B1 | 12/2001 | Gallagher et al. | |
| 6,405,108 B1 | 6/2002 | Patel et al. | |
| 6,493,627 B1 | 12/2002 | Gallagher et al. | |
| 6,552,439 B1 | 4/2003 | Dunsworth et al. | |
| 6,560,528 B1 | 5/2003 | Gitlin et al. | |
| 6,561,014 B1 | 5/2003 | Smith et al. | |
| 6,564,172 B1 | 5/2003 | Till | |
| 6,725,134 B1 | 4/2004 | Dillen et al. | |
| 6,763,708 B1 * | 7/2004 | Ting et al. ........ | 73/118.1 |

* cited by examiner

*Primary Examiner*—Carl S. Miller
(74) *Attorney, Agent, or Firm*—Gerald W. Spinks

(57) ABSTRACT

A fuel injection timing control system for diesel engines operating at high altitude, including a sensor for a parameter of the engine intake air, such as engine intake air pressure or turbocharger speed. This sensor communicates with a barometric pressure timing controller, and a throttle position sensor communicates with the barometric pressure timing controller. Nominal values of the engine intake air parameter at various throttle notch settings and various engine performance parameters are stored in a table, for a nominal barometric pressure. The barometric pressure timing controller determines the instantaneous barometric pressure by adjusting the nominal barometric pressure based on the difference between the instantaneous value for the engine intake air parameter and the nominal value for the engine intake air parameter, at the known throttle notch setting and the known engine performance parameters. The barometric pressure timing controller then adjusts fuel injection timing in response to the thusly determined barometric pressure and the sensed throttle position, by advancing or retarding the fuel injection timing by predetermined values as the barometric pressure or the throttle position changes. The predetermined values of fuel injection timing are selected to reduce exhaust emissions and increase engine efficiency and performance under various barometric pressure conditions so that the engine may be operated continually and optimally under various barometric pressure conditions.

3 Claims, 3 Drawing Sheets

BAROMETRIC PRESSURE DIESEL TIMING CONTROLLER

CROSS REFERENCE TO RELATED APPLICATIONS

This is a continuation patent application of U.S. patent application Ser. No. 11/031,571, filed on Jan. 6, 2005, now abandoned, and entitled "Barometric Pressure Diesel Timing Controller."

STATEMENT REGARDING FEDERALLY SPONSORED RESEARCH OR DEVELOPMENT

Not Applicable

BACKGROUND OF THE INVENTION

1. Field of the Invention

This invention relates generally to diesel engines and, more particularly, to medium speed diesel engines for operation at high altitudes.

2. Background Art

Power is generated in a diesel engine by diffusing and combusting diesel fuel in a plurality of engine cylinders. Liquid fuel is injected into the engine cylinders, which are full of compressed air at high temperature. The fuel is broken up into droplets, which evaporate and mix with the air in the cylinders to form a flammable mixture. Complete and efficient combustion in the cylinders requires full oxidation of fuel through evaporation, species diffusion, and mixing with air, and timely heat release during the combustion process. Thus, the amount of air charged into the cylinder, or the air to fuel ratio of the mixture, plays an important role in diesel engine fuel-air mixing and combustion, which, in turn affects fuel efficiency and exhaust emissions. This is particularly true for quiescent chamber type medium speed heavy-duty diesel engines where the cylinder air intake swirling is slight, such as locomotive or marine engines having cylinders with relatively large displacement volumes. The fuel injection timing of medium speed diesel engines operating at full load is typically set so that the actual peak firing pressure in the cylinders is at or below a maximum cylinder firing pressure under normal altitude operation, i.e., at about sea level.

Engine exhaust emissions, including carbon monoxide (CO), particulate matter (PM), and smoke, are generated when the air-fuel mixture is incompletely combusted. When engines are operated at higher altitudes, i.e., at a low barometric pressure, lesser amounts of air are introduced into the cylinders, causing the air-fuel mixing process to be deteriorated relative to lower altitude, higher ambient pressure environments. This combination of factors increases late and incomplete combustion in the engine cylinders, which lowers fuel efficiency and increases exhaust emissions of CO, PM, and smoke. The reduced amount of air for the fuel-air mixture combustion, together with the increased amount of late and incomplete combustion, typically leads to reduced peak cylinder firing pressure and increased cylinder exhaust gas temperatures. For engines including a turbocharger, the decreased barometric pressure and the increased exhaust temperature cause an increase in turbocharger speed. This usually requires power deration to prevent turbocharger damage from overheating and excessive speed.

Accordingly, it would be desirable to operate a diesel engine at higher altitudes that avoids the resultant increase in exhaust emissions. Additionally, it would be desirable to operate a diesel engine at higher altitudes with minimal deterioration of engine efficiency, power capacity, and engine performance relative to normal altitude operation.

BRIEF SUMMARY OF THE INVENTION

In an exemplary embodiment of the invention, a fuel injection system for a diesel engine having at least one fuel injection pump and at least one fuel injector connected to at least one engine cylinder includes a fuel injection controller, a throttle position sensor and a sensor which senses the value of a parameter relative to the engine intake air. In the present invention, that is, the value of a parameter relative to the engine intake air is sensed, rather than sensing the barometric pressure itself.

This engine intake air parameter could be the air pressure in the engine intake manifold or the turbocharger speed, for example. The intake air pressure type sensor can be in fluid communication with the engine intake manifold to sense the pressure therein. The turbocharger speed type sensor can be a tachometer output on the turbocharger, for example. In either case, the output of the engine intake air parameter sensor is connected to a barometric pressure timing controller. The barometric pressure timing controller compares the instantaneous engine intake air parameter with a nominal value of the engine intake air parameter and determines the instantaneous barometric pressure from that comparison. The barometric pressure timing controller then adjusts the fuel injection timing by controlling the fuel injection pump and the fuel injector according to changes in barometric pressure, to advance or retard fuel injection timing to reduce untimely and incomplete combustion in the engine cylinders. Engine efficiency may therefore be optimized, and exhaust emissions may be reduced, when the engine is operated at higher altitudes at a desired speed and power determined by a selected throttle position.

The barometric pressure timing controller is an electronic controller, such as a microprocessor with a memory of predetermined fuel injection timing values that have been found to minimize exhaust emissions while optimizing steady state engine operation under the corresponding barometric pressure, without exceeding a maximum peak firing pressure in the engine cylinders. Thus, the engine may be continuously and optimally operated under varying pressure conditions while minimizing exhaust emissions and maintaining optimum engine performance. As exhaust emissions are reduced, and combustion in the cylinders is more timely and complete, engine power deration due to turbocharger overspeed is largely avoided.

The novel features of this invention, as well as the invention itself, will be best understood from the attached drawings, taken along with the following description, in which similar reference characters refer to similar parts, and in which:

DETAILED DESCRIPTION OF THE INVENTION

Figure 1:
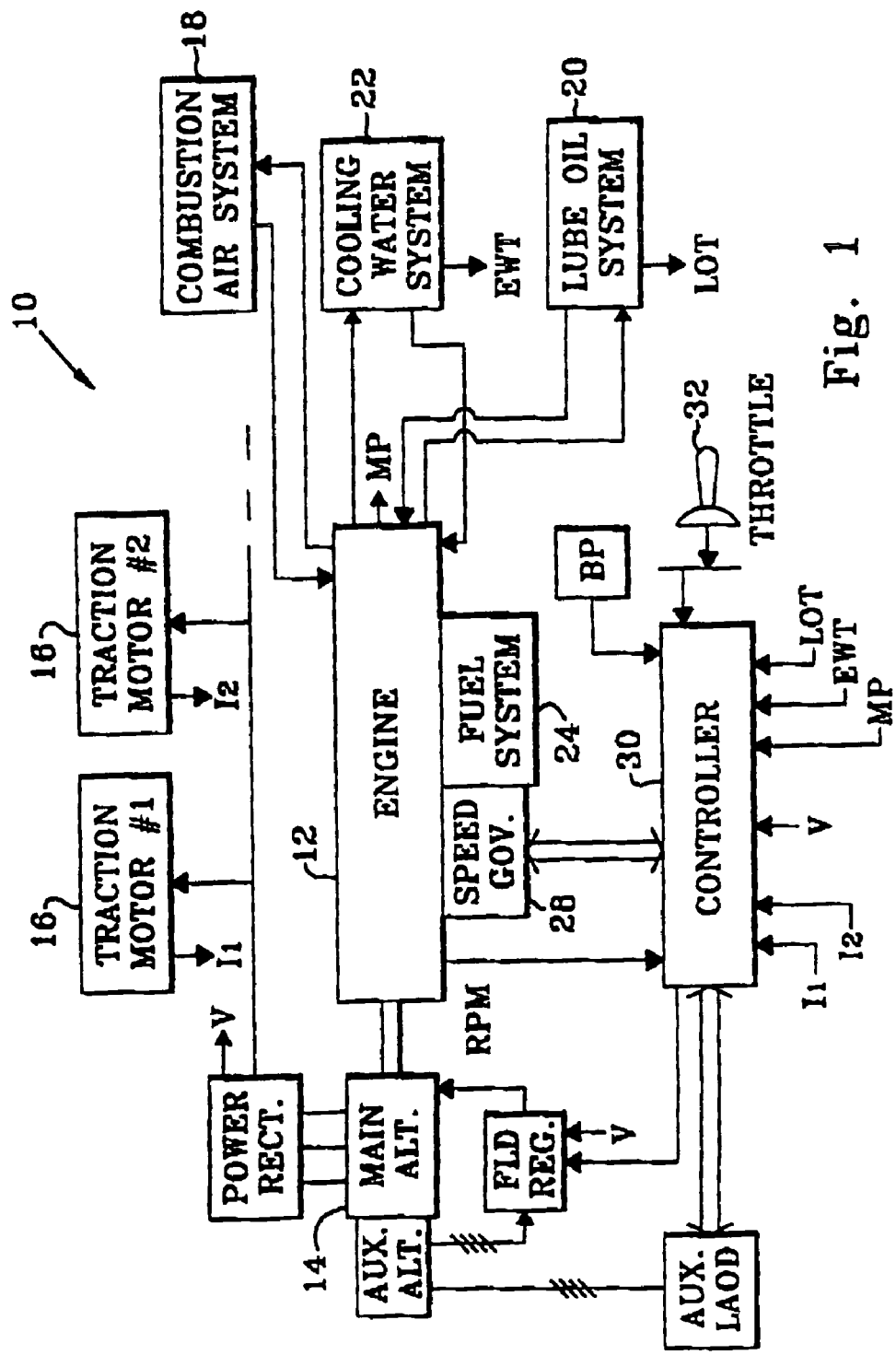
FIG. 1 is a schematic view of a diesel engine system.

FIG. 1 is a schematic illustration of a propulsion system 10 including a diesel engine 12. Particularly, and in an exemplary embodiment, the system 10 is used in a self propelled locomotive. The engine 12 is mechanically coupled to a rotor of a main alternator 14 to power a plurality of traction motors 16 that are positioned on each side of an axle of the locomotive to propel the locomotive. While the present invention is described in the context of a locomotive, it is recognized that the benefits of the invention accrue to other applications of diesel engines, and to other varieties of diesel engines beyond that specifically described. Therefore, this embodiment of the invention is intended solely for illustrative purposes and is in no way intended to limit the scope of application of the invention.

The engine 12 is a high horsepower, turbocharged, multiple-cylinder diesel engine, and includes a number of ancillary systems, such as a combustion air system 18, a lube oil system 20, a cooling water system 22, and a fuel system 24. The combustion air system 18 includes an engine exhaust gas driven turbocharger for compressing air in a combustion air manifold of the engine 12. The lube oil system 20 includes an oil pump and associated piping for supplying suitable lubricating oil to the various moving parts of the engine 12. The cooling water system 22 includes a pump for circulating relatively cool water from one or more air cooled radiators to a lube oil cooler, to a plurality of cylinder liners of the engine 12 for absorbing heat generated in the combustion process, and also to one or more "intercoolers" through which combustion air passes after being compressed, and therefore heated, by the turbocharger.

The fuel system 24 includes a fuel tank, fuel injection pumps, and fuel injector nozzles for injecting diesel fuel into a plurality of power cylinders. A fuel pump controller 28 controls the start and duration of fuel flow into each of the cylinders. In a mechanically fuel injected engine, the fuel pump controller 28 is a governor controller linked to fuel injection pump racks to control the start of and duration of fuel flow into an engine cylinder upon each actuation of the respective fuel injectors. In an electronically fuel injected engine, the fuel pump controller 28 is an electronic controller connected to electrically actuated valves in the fuel pump to control when and for how long fuel flows into a cylinder upon actuation of an associated fuel injector. The fuel pump controller 28 regulates engine speed by minimizing any difference between a desired speed and an actual operating speed. The desired speed is set by a variable speed control signal received from an engine controller 30 in response to a manually or automatically selected position or input of a throttle 32 according to defined speed-load schedules.

Figure 2:
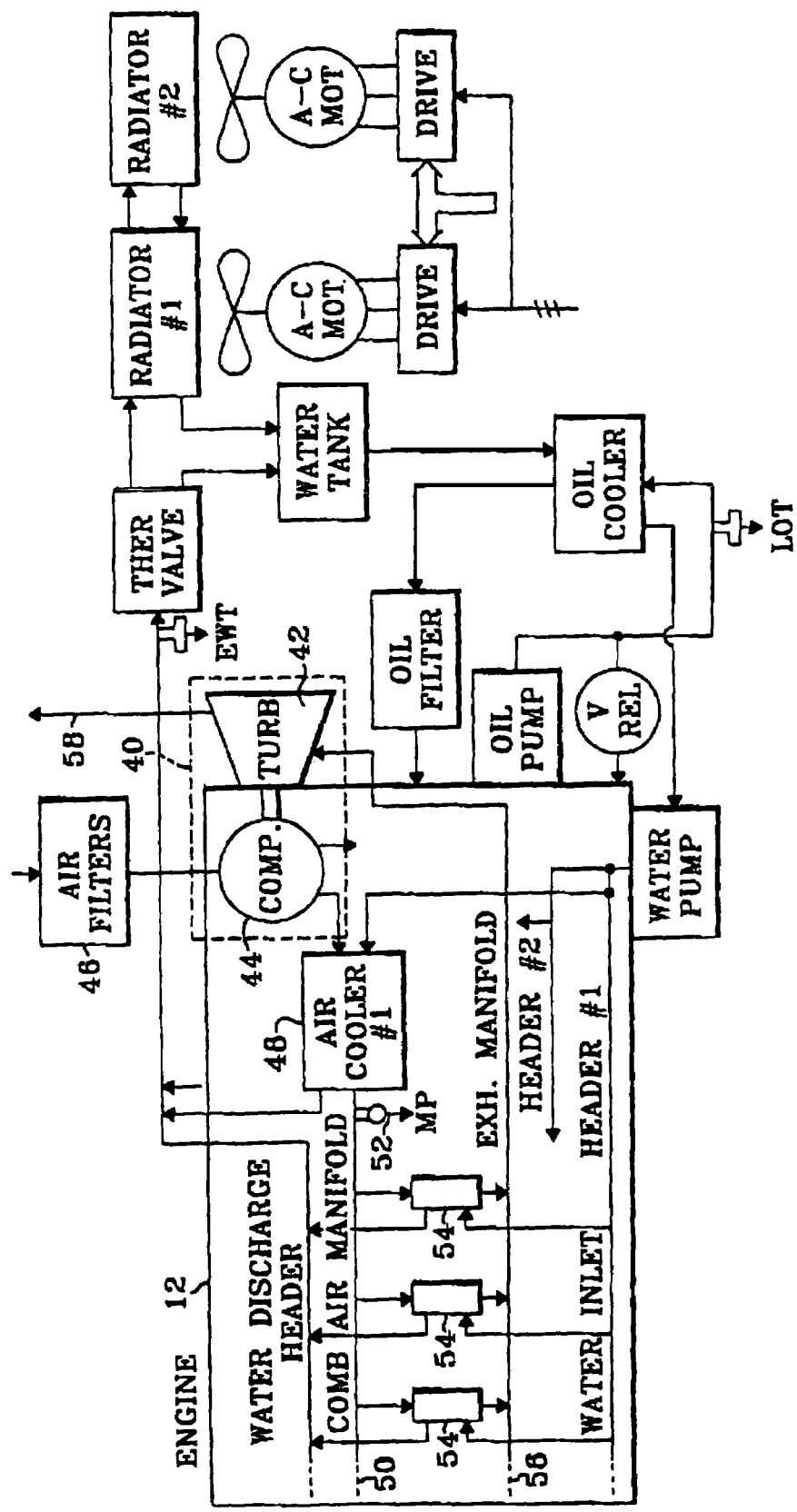
FIG. 2 is a simplified schematic view of the system shown in FIG. 1.

FIG. 2 is a schematic illustration of the exemplary diesel engine 12. A turbocharger 40 in the combustion air system 18 includes a turbine 42, the output of which drives a centrifugal air compressor 44. Air is collected in a plenum, passed through an array of air filters 46, and delivered to a central inlet of the compressor 44 and discharged from the compressor 44 at elevated temperature and pressure to an air-water heat exchanger 48, known as an aftercooler or intercooler. From the intercooler 48, compressed air passes into a combustion air intake manifold 50. Compressed air is supplied to the power cylinders 54 from the combustion air intake manifold 50.

Gases produced during combustion are exhausted from each of the power cylinders into an exhaust manifold 56. The exhaust gases drive the rotor of the turbine 42 prior to their discharge through an exhaust stack 58 to the atmosphere. The speed of the turbine 42 typically increases as the engine 12 develops more power. With the engine running at or near full power, the compressor 44 compresses combustion air to more than twice atmospheric pressure. One or more intercoolers 48 lower the temperature of the compressed air, which is heated appreciably during the compression process, thereby enlarging the amount of the air charge by filling the cylinders with higher density air, and lowering the thermal loading of the engine 12.

Hot engine oil is pumped by an oil pump 60 to an inlet of an oil-water heat exchanger 64, and cooled oil flows from the oil-water heat exchanger 64 through an oil filter 66 and to an oil supply header. Oil is distributed from the supply header to various bearings, valves, pistons, gears, and other moving parts of the engine 12 for lubricating and cooling purposes. A thermistor 72 is exposed to oil flowing in a pipe 62 near an inlet of the oil cooler.

The cooling water system 22 comprises a water storage tank 74 from which relatively cool water flows, via heat exchanger tubes inside the oil cooler 64, to a water pump 76. The water pump 76 raises the pressure of the water which flows through the cylinder jackets of the cylinders 54 to a common water discharge header 80. Cooling water is also pumped through the intercooler 48 to extract heat from the combustion air discharged from the compressor 44 at an elevated temperature. The system is balanced hydraulically so that the flow rate to one or more intercoolers is in a desired flow rate to the cylinder jackets.

Hot water leaving the engine from the discharge header 80 flows through at least one fluid valve 86. The fluid valve 86 is typically coupled to a thermistor that diverts water to the water storage tank 74 when the temperature of the water in the valve 86 is below a predetermined temperature or when the water pressure is below a predetermined pressure. When cooling water is above a predetermined temperature, or above a predetermined pressure, water flows into one or more water-air heat exchangers, or radiators 94. After being cooled in the radiators 94, water is discharged into the water tank 74.

Figure 3:
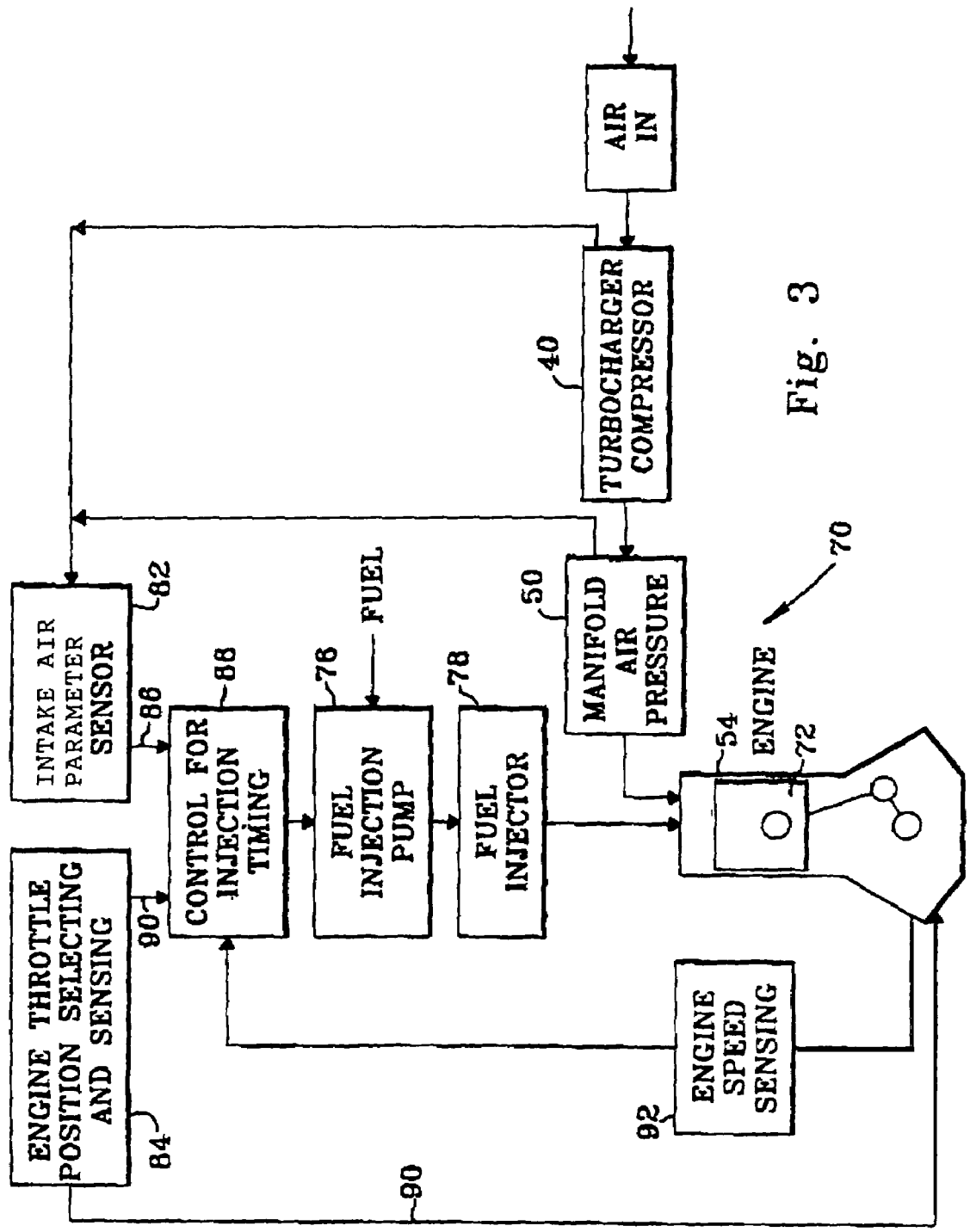
FIG. 3 is a schematic view of a control system for use with the engine system shown in FIG. 2.

FIG. 3 schematically illustrates a control system 70 for the exemplary engine 12 including a plurality of pistons 72 operating in a plurality of cylinders 54. A fuel injection pump 76 and a fuel injector 78 are operable to inject fuel into each cylinder 54 for combustion to produce energy for driving the pistons 72 in a downward direction. As the fuel is injected, it is mixed with cylinder-compressed air in each cylinder 54 supplied by the combustion air manifold 50 and the turbocharger 40. Air is supplied to the turbocharger 40 through an appropriate air intake unit (not shown) that includes the air filters 46 to filter particulate matter from the air.

The fuel injection pump 76 and the fuel injector 78 are controlled by a barometric pressure timing controller 88 to control fuel injection timing, i.e., when fuel injection into the cylinders 54 begins. The barometric pressure timing controller 88 can be integral with the fuel pump controller 28, a discrete component of the engine controller 30, or a separate controller cooperating with the fuel pump controllers 28 and the engine controller 30. The barometric pressure timing controller 88, by altering fuel injection timing at the corresponding engine throttle input or throttle position, reduces exhaust emissions and increases engine efficiency at higher altitudes, i.e., at lower barometric pressure.

A sensor 82 senses a parameter related to the engine intake air, such as the pressure in the intake manifold or the turbocharger speed. This engine intake air parameter sensor 82 is coupled to the barometric pressure timing controller 88. An engine intake air parameter signal 86 is supplied to the barometric pressure timing controller 88 from the sensor 82 for adjusting operation of the fuel injection pump 76 and the fuel injector 78 to reduce exhaust emissions, enhance engine efficiency, and maintain engine power capacity at higher altitudes. The barometric pressure timing controller 88 includes a microcomputer (not shown) and electronic controls (not shown), which are well known in the art.

A table of values of expected or nominal levels of the engine intake air parameter are empirically determined, at a nominal barometric pressure, at various throttle notch settings, and for various sets of engine performance characteristics. The table can be integral with the barometric pressure timing controller 88. The engine performance characteristics can include characteristics such as horsepower output, rpm, injection timing, and manifold air temperature. For example, an expected or nominal value of engine intake air pressure can be accessed from this table, for a nominal barometric pressure, at a given throttle notch setting, and for various sets of engine performance characteristics. Alternatively, an expected or nominal value of turbocharger speed can be accessed from this table, for a nominal barometric pressure, at a given throttle notch setting, and for various sets of engine performance characteristics.

At least one throttle position sensor 84 is connected to the engine 12 and to an engine input, such as the throttle 32, to assess the selected engine throttle position, or the desired speed and load of the engine. A throttle position signal 90 is supplied to a loading device, such as an alternator (not shown) mechanically coupled to the engine to generate a desired engine power corresponding to the selected throttle position. The fuel injection controller 28 controls fuel injection timing by operating the fuel injection pump 76 and the fuel injector 78 to begin fuel injection at an optimal time in the injection cycle in response to the barometric pressure and throttle position.

The barometric pressure of the engine air supply is monitored by the control system 70 to distinguish high altitude operation from normal altitude operation, and the barometric pressure timing controller 88 adjusts fuel injection timing as a function of air to fuel ratios at elevated altitudes. Therefore, exhaust emissions can be reduced, and engine performance comparable to normal altitude performance is achieved.

The engine intake air parameter sensor senses an instantaneous or known value of the engine intake air parameter, such as the pressure in the engine intake air manifold. The barometric pressure timing controller 88 compares this sensed instantaneous value with the nominal value of the engine intake air parameter which was accessed from the aforementioned table. If an exact set of engine performance characteristics and throttle notch setting is not available in the table, if desired, interpolation can be performed by the barometric pressure timing controller 88. Based on the difference between the instantaneous value and the nominal value of the engine intake air parameter, the barometric pressure timing controller 88 adjusts the nominal barometric pressure to determine the instantaneous barometric pressure.

If the engine intake air parameter being sensed is turbocharger speed, rather than engine intake air pressure, a second table can be provided, which stores empirically determined values of the difference between nominal and instantaneous engine intake air pressure for various differences between nominal and instantaneous turbocharger speed, at various throttle notch settings and for various sets of engine performance characteristics. Once the sensor 82 senses the instantaneous turbocharger speed, the barometric pressure timing controller 88 looks up the expected or nominal value of turbocharger speed for the known throttle notch setting and the known set of engine performance characteristics. Then, the barometric pressure timing controller 88 looks up the difference between nominal and instantaneous engine intake air pressure, from the second table, based on the difference between the known and instantaneous turbocharger speed. As with the first table, if desired, interpolation of the values in the second table can be performed by the barometric pressure timing controller 88. Finally, then, the difference between nominal and instantaneous engine intake air pressure, from the second table, is used by the barometric pressure timing controller 88 to adjust the nominal barometric pressure to determine the instantaneous barometric pressure.

If a low barometric pressure representing a high altitude is determined, fuel injection timing is advanced, i.e., fuel injection starts at an earlier point in time in the piston cycle, according to a predetermined value selected from a table, or tables, of fuel injection timing values stored in memory of the barometric pressure timing controller 88 and corresponding to the instantaneous barometric pressure and engine speed and load, which is dictated by throttle position. Because the engine speed 92, and the amount of fuel to be injected at each injection cycle to maintain the desired engine speed and power, is dictated by the throttle position, an optimum fuel injection timing value can be selected based on the barometric pressure and the throttle position. Of course, other known indicators of engine speed and load may be used to select a fuel injection timing value. If necessary, or as desired, the barometric pressure timing controller 88 may interpolate between values in the tables to calculate a desired fuel injection timing value, or to fine tune fuel injection timing.

Each of the stored fuel injection timing values minimizes exhaust emissions and optimized engine efficiency while preventing cylinder pressures above the allowable peak firing pressure in the cylinders 54. By advancing fuel injection timing by the predetermined value, the peak firing pressure of the cylinder 54 is increased to be closer to the designed maximum allowable peak firing pressure of the cylinder during high engine loads at higher altitudes so that the engine 12 generates sufficient power. Also, as a result of the fuel injection timing being advanced, the air-fuel mixing is prolonged to allow a more complete and timely combustion with an improved timeliness of heat release. Further, as untimely and late combustion is reduced, exhaust emission temperatures are reduced. Consequently, the speed of the turbocharger 40 is reduced, and the need for power deration to prevent turbocharger damage is minimized.

As barometric pressure changes, the barometric pressure timing controller 88 adjusts fuel injection timing accordingly, so that the engine 12 may be continuously operated under different pressure conditions with minimal deterioration of engine performance. Thus, fuel injection timing is advanced from normal altitude values during high elevation operation, and retarded or returned to normal altitude values when the engine 12 is returned to normal altitude. Of course, the same principles can be applied to operate the engine 12 and maintain peak firing pressure at or below the maximum allowable pressure value when operating an engine at or below sea level. Fuel injection timing can be adjusted by the barometric pressure timing controller 88 either continuously with changes in barometric pressure, or in steps with specified levels of pressure change. For example, the barometric pressure timing controller 88 may adjust fuel injection timing when barometric pressure increases or decreases by two pressure units from a given operating pressure.

At lower engine loads in high altitude operation, fuel injection timing is adjusted by the barometric pressure timing controller 88 to optimize steady state operation of the engine 12. More specifically, advancing the fuel injection timing has significant benefits at lower engine loads because the turbocharger 40 is relatively sluggish. When the engine operates under partial load, the turbocharger turbine 42 rotates slower than when the engine 12 operates at full load. Consequently, the turbocharger turbine 42 does not rotate as fast, so less pressure is developed in the cylinders 54 and the deterioration of exhaust emissions is more pronounced. Because of the relatively low cylinder firing pressure at lower engine loads, exceeding a maximum firing pressure by adjusting the fuel injection timing advance is of little practical concern. Thus, the injection timing can be freely set for optimum emissions and fuel efficiency performance for a given air supply pressure and engine throttle position. Based on the barometric pressure and throttle position, the barometric pressure timing controller 88 selects fuel injection timing values from predetermined values stored in the altitude timing controller memory and found to achieve optimum fuel efficiency and emission reductions without exceeding the maximum peak allowable firing pressure in the cylinders 54 for a given engine speed and engine load.

Thus, a diesel engine fuel injection timing control is provided that allows for optimal engine efficiency and performance with reduced emissions despite changes in barometric pressure, without having to measure actual barometric pressure.

While the particular invention as herein shown and disclosed in detail is fully capable of obtaining the objects and providing the advantages hereinbefore stated, it is to be understood that this disclosure is merely illustrative of the presently preferred embodiments of the invention and that no limitations are intended other than as described in the appended claims.

We claim:

1. A fuel injection control system for a diesel engine for powering a railroad locomotive, said fuel injection control system comprising:
   a barometric pressure timing controller adapted to control fuel injection timing based on changes in barometric pressure;
   a memory in communication with said barometric pressure timing controller for storing a nominal value of a parameter of the engine intake air corresponding to an engine performance characteristic, where said nominal value of said engine intake air parameter is measured at a nominal barometric pressure;
   a sensor in communication with said barometric pressure timing controller for sensing an instantaneous value of said engine intake air parameter; and
   at least one engine performance sensor in communication with said barometric pressure timing controller for sensing an instantaneous value for said engine performance characteristic;
   wherein said barometric pressure timing controller communicates with said memory to access a nominal value of said engine intake air parameter corresponding to said instantaneous value of said engine performance characteristic; and
   wherein said barometric pressure timing controller determines an instantaneous value of barometric pressure based on said nominal value of barometric pressure and the difference between said nominal value of said engine intake air parameter and said instantaneous value of said engine intake air parameter, to provide a signal indicative of changed barometric pressure to control fuel injection timing.

2. The system recited in claim 1, wherein said engine intake air parameter is air pressure in the engine intake.

3. The system recited in claim 1, wherein said engine intake air parameter is turbocharger speed.

* * * * *